United States Patent [19]

Teraoka

[11] Patent Number: 4,899,859
[45] Date of Patent: Feb. 13, 1990

[54] POWER TRANSMISSION APPARATUS

[75] Inventor: Masao Teraoka, Tochigi, Japan

[73] Assignee: Tochigifujisangyo Kabushiki Kaisha, Tochigi, Japan

[21] Appl. No.: 266,126

[22] Filed: Nov. 2, 1988

[30] Foreign Application Priority Data

Nov. 5, 1987 [JP] Japan .................. 62-168425[U]

[51] Int. Cl.$^4$ .............................................. B60K 23/08
[52] U.S. Cl. ..................................... 192/4 A; 192/57; 192/58 B; 192/82 T; 192/89 A; 180/233; 180/247
[58] Field of Search ............ 192/4 A, 35, 58 B, 58 C, 192/82 T, 89 A, 57; 180/248, 249, 250, 244, 233, 247

[56] References Cited

U.S. PATENT DOCUMENTS

| | | | |
|---|---|---|---|
| 3,923,113 | 12/1975 | Pagdin | 192/82 T X |
| 4,562,897 | 1/1986 | Renneker | 180/233 |
| 4,605,087 | 8/1986 | Ashauer et al. | 180/248 |
| 4,671,377 | 6/1987 | Ehrlinger et al. | 180/249 |
| 4,712,448 | 12/1987 | Lanzer | 180/250 X |
| 4,744,435 | 5/1988 | Schnurer | 180/233 |
| 4,747,643 | 5/1988 | Lanzer | 180/249 X |
| 4,770,266 | 9/1988 | Yamaguchi et al. | 180/249 X |
| 4,809,808 | 3/1989 | Sommer | 180/249 X |

FOREIGN PATENT DOCUMENTS

| | | |
|---|---|---|
| 0240795 | 10/1987 | European Pat. Off. . |
| 0283821 | 9/1988 | European Pat. Off. . |
| 3430465 | 5/1986 | Fed. Rep. of Germany . |
| 3702352 | 8/1987 | Fed. Rep. of Germany . |
| 3708193 | 10/1987 | Fed. Rep. of Germany . |
| 3630433 | 3/1988 | Fed. Rep. of Germany . |
| 3735823 | 5/1988 | Fed. Rep. of Germany . |
| 8602133 | 4/1986 | PCT Int'l Appl. . |

*Primary Examiner*—Leslie A. Braun
*Assistant Examiner*—Richard M. Lorence
*Attorney, Agent, or Firm*—Samuels, Gauthier, Stevens & Kehoe

[57] ABSTRACT

To incorporate a viscous coupling type power transmission apparatus for a four-wheel driven automotive vehicle with an antiskid braking system, viscous torque transmission from a first rotary transmission shaft (coupled to the front wheel shaft) to a second rotary transmission shaft (coupled to the rear wheel shaft) is intermitted by a clutch mechanism provided for the power transmission apparatus whenever a foot brake is applied. That is, when a foot brake pressure is applied to the brake member of the power transmission apparatus, the clutch mechanism is disengaged via a cam ring to decouple the first rotary transmission shaft from the second rotary transmission shaft.

3 Claims, 4 Drawing Sheets

POWER TRANSMISSION APPARATUS

BACKGROUND OF THE INVENTION

1. Field of the Invention

The present invention relates to a power transmission apparatus for a four-wheel driven vehicle, and more specifically to a power transmission apparatus of viscous coupling type provided with a clutch mechanism.

2. Description of the Prior Art

Conventionally, there are various power transmission apparatus for a four-wheel driven vehicle, which can be classified according to presence or absence of a central differential gear device for absorbing a difference in revolution speed between front and rear wheel shafts, or the number or the arrangement condition of the differential limiting devices, etc.

FIG. 1 shows one of the prior-art power transmission apparatus, which is composed of a final reduction gear 205 driven by a drive gear 203 of a transmission 201; a front wheel differential gear device 207 rotated together with this final reduction gear 205; a direction converting gear assembly 209 driven by the front wheel differential gear device 207 to convert the rotational direction of the driving force at a right angle; and a viscous coupling device 213 provided for a transmission shaft to transmit the rotary force from the direction converting gear assembly 209 to the rear wheel differential gear device 211.

In the above-mentioned power transmission apparatus as described above, since no central differential gear device is incorporated to absorb a difference in rotational speed between the front and rear wheel shafts, there exists an advantage that the structure is simple. In addition, since power (torque) is transmitted to the rear wheel shaft (indirectly coupled wheel shaft) via the viscous coupling device 213, it is possible to automatically distribute torque to both the front and rear wheels in the same way as when two-wheel driving is switched to four-wheel driving or vice versa according to road and travel conditions.

In the prior-art power transmission apparatus, however, since a big difference in revolution speed between locked side (e.g. front) wheel shaft and non-locked side (e.g. rear) wheel shaft will be produced when an emergency brake is applied to the four wheel driven vehicle, a large braking force is inevitably transmitted from the locked side (e.g. front) wheel shaft to the non-locked side (e.g. rear) wheel shaft on the basis of the characteristics of the viscous coupling. This problem is disadvantageous in an antiskid braking system (ABS) for obtaining excellent brake characteristics by applying an appropriate braking force to each wheel shaft; that is, there exists a problem in that it is impossible to operate the antiskid braking system reliably in cooperation with the power transmission apparatus of viscous coupling type.

On the other hand, when the vehicle is running at high speed for many hours under the condition that tire inflation pressure is different between the front and rear wheels, since a big difference in revolution speed will be produced between the front and rear wheels, there exists another problem in that a large load is applied to the viscous coupling and therefore the temperature of silicon oil within the fluid working chamber rises abnormally and thus the viscous coupling may be damaged.

SUMMARY OF THE INVENTION

With these problems in mind, therefore, it is the primary object of the present invention to provide a power transmission apparatus for a four wheel driven vehicle in which torque transmission via a viscous coupling device can be intermitted according to situation.

To achieve the above-mentioned object, a power transmission apparatus of the present invention comprises (a) a first rotary transmission shaft; (b) a second rotary transmission shaft rotatably and coaxially coupled to said first rotary transmission shaft; (c) an outer coupling case rotatably and coaxially disposed around said first and second rotary transmission shafts in such a way as to form an enclosed working chamber filled with a viscous fluid between said first rotary transmission shaft and said outer coupling case and a clutch housing between said second rotary transmission shaft and said outer coupling case; (d) a plurality of resistant plates arranged within the working chamber and circumferentially fixed to said first rotary transmission shaft and said outer coupling case alternately one by one, for coupling said first rotary transmission shaft to said outer coupling case via the viscous fluid; (e) a clutch mechanism, disposed within the clutch housing, for engaging or disengaging said outer coupling case with or from said second rotary transmission shaft; and (f) clutch operating means, responsive to a braking force applied thereto, for operating said clutch mechanism.

The clutch operating means is operated to disengage the outer coupling case from the second rotary shaft when a vehicle foot brake is depressed or when temperature within the working chamber rises beyond a predetermined temperature.

The clutch mechanism comprises a plurality of clutch plates, a clutch spring, and a slide sleeve urged by the clutch spring toward the clutch plates to bring the plural clutch plates into contact with each other for clutch engagement.

The clutch operating means comprises a cylindrical portion of the outer coupling case formed with a cam portion, a cam ring fixed to the slide sleeve so as to be engaged with the cam portion of the cylindrical portion, a brake disk spline coupled to the slide sleeve, and a U-shaped brake frame for sandwiching the brake disk, when actuated, to move the slide sleeve along the second rotary shaft by the cam ring to disengage the clutch mechanism.

In the power transmission apparatus of the present invention, engine power is transmitted from the first rotary (e.g. front wheel drive) shaft to the second rotary (e.g. rear wheel drive) shaft by way of the working chamber, the coupling case, and the clutch mechanism. However, when the clutch operating mean is activated as when the foot brake is applied or fluid temperature rises abnormally, since the clutch mechanism is disengaged, it is possible to intermit power transmission from the first rotary shaft to the second rotary shaft.

BRIEF DESCRIPTION OF THE DRAWINGS

The features and advantages of the power transmission apparatus according to the present invention will be more clearly appreciated from the following description of the preferred embodiment of the invention taken in conjunction with the accompanying drawings and in which.

DETAILED DESCRIPTION OF THE PREFERRED EMBODIMENTS

One embodiment of the present invention will be described in detail hereinbelow with reference to FIGS. 2 to 4, in which the right and left directions disclosed in the specification correspond to those in these drawings.

Figure 1:
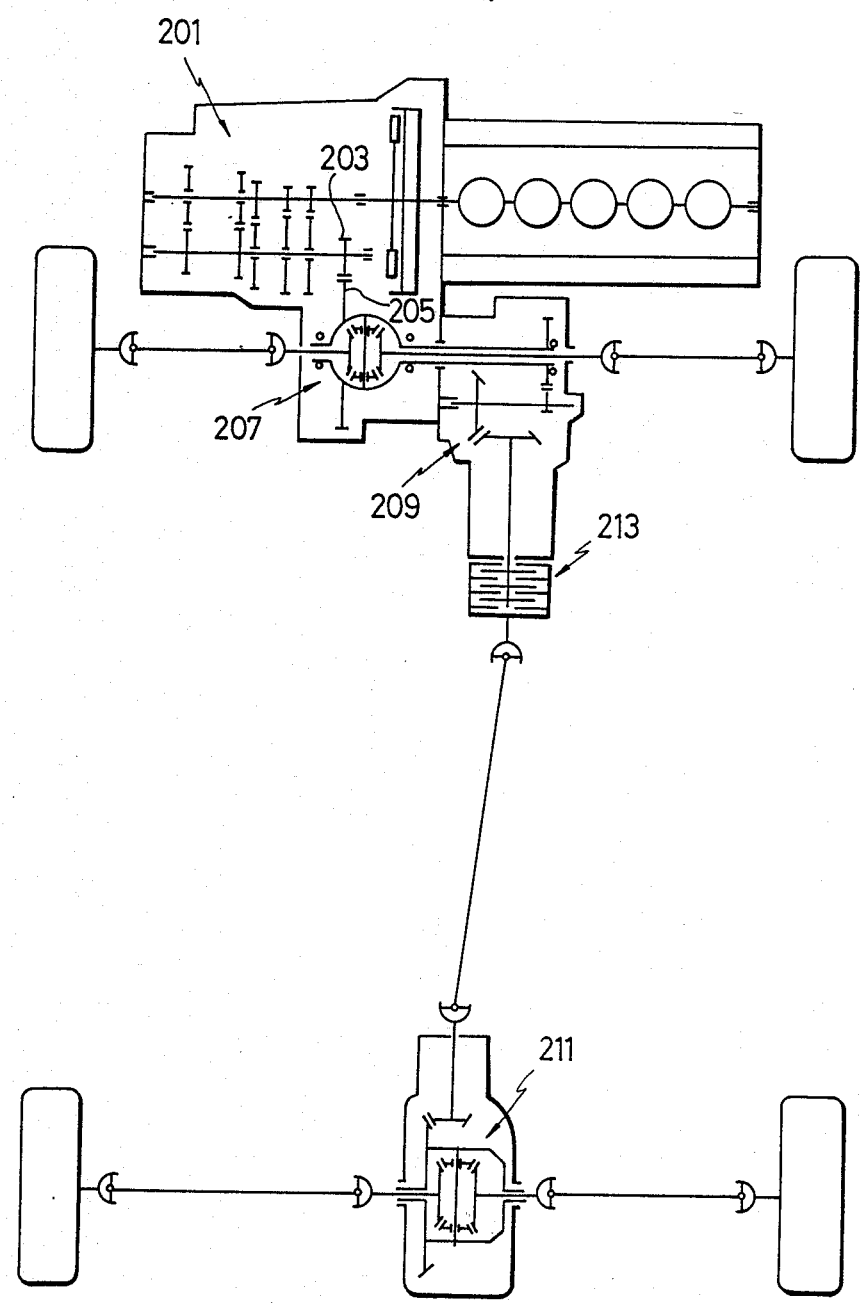
FIG. 1 is a skeletal mechanism diagram showing a four wheel driven vehicle to which a prior-art power transmission apparatus is applied.
Figure 2:
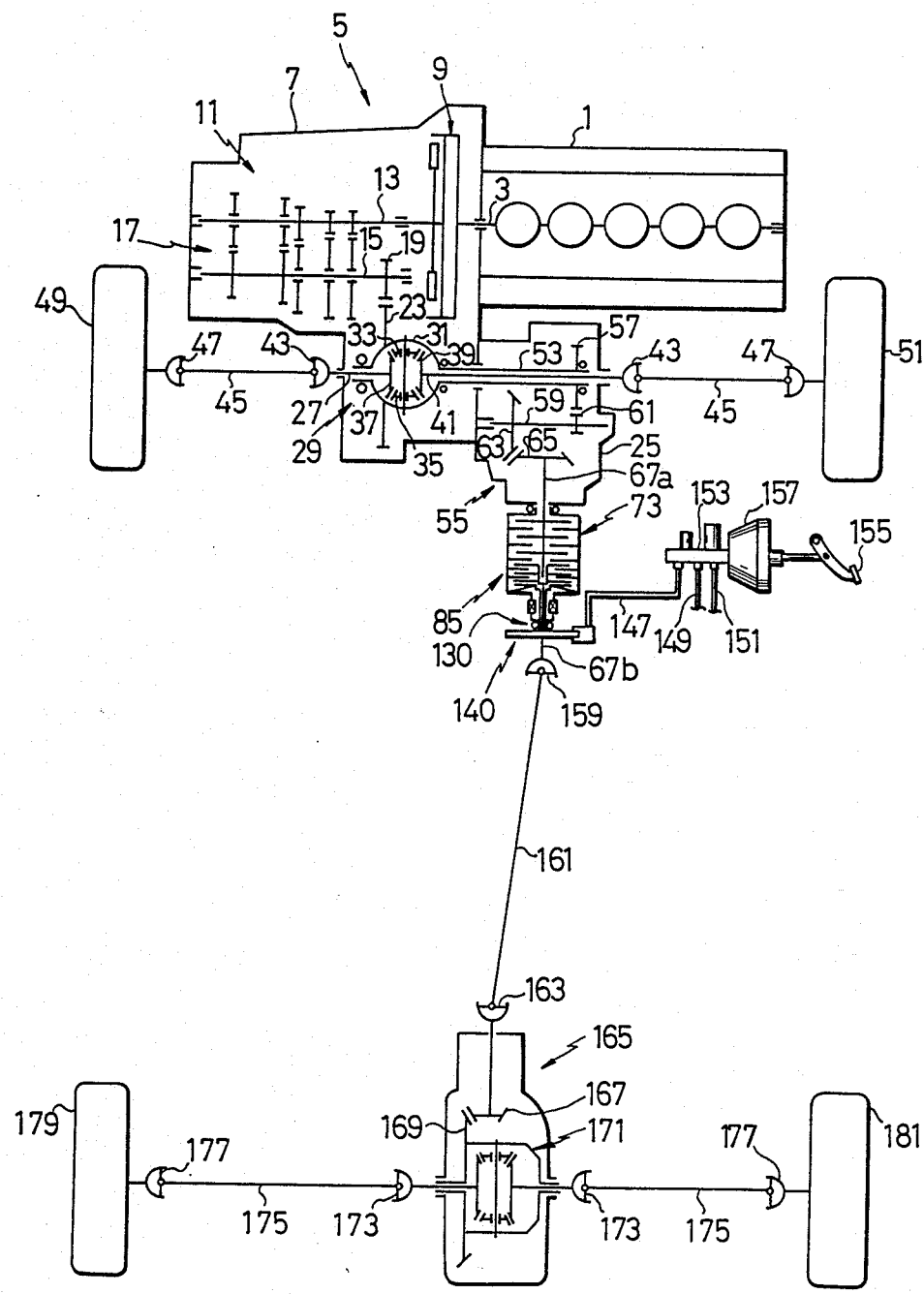
FIG. 2 is skeletal mechanism diagram showing a four wheel driven vehicle to which an embodiment of the present invention is applied.

In FIG. 2, an engine 1 is arranged at the vehicle front with its crankshaft set in the vehicle transverse direction. A transaxle 5 housed within a transaxle casing 7 includes a transmission 11 linked in series with a clutch 9 and the engine 1. This transmission 11 is composed of an input shaft 13 linked to the crankshaft 3 via the clutch 9; an output shaft 15 arranged in parallel to this input shaft 13; and a speed change gear assembly 17.

A drive gear 19 is provided on the right end of the output shaft 15. This drive gear 19 is in mesh with a final reduction gear 23.

Within a transfer casing 25 arranged near the transaxle casing 7 or near the center of the front wheel shaft, a first (front wheel) differential gear device 29 of bevel gear type is disposed coaxial with a front wheel shaft 27. The final reduction gear 23 is fixed to a casing 31 of the front wheel differential gear device 29.

Within this casing 31, there are disposed a pair of pinion gears 33 and 35 rotatably attached to a shaft supported by the casing 31 perpendicular to the rotary shaft of the casing 31 and a pair of side gears 37 and 39 in mesh with these pinion gears 33 and 35. The lefthand side gear 37 is spline linked with the lefthand front wheel shaft 27; the righthand side gear 39 is spline linked with the righthand front wheel shaft 41, respectively. The front wheel shafts 27 and 41 are linked to the lefthand and righthand front wheels 49 and 51 via a constant velocity joint 43, a drive wheel shaft 45 and a constant velocity joint 47, respectively.

Further, the casing 31 is linked with a direction converting gear assembly 55 (disposed within a transfer casing 25) via a first tubular transmission shaft 53 supported by the front wheel shaft 41. This direction converting gear assembly 55 comprises a power transmission gear 57 disposed on the right side of the first transmission shaft 53; an intermediate gear 61 spline linked to an intermediate shaft 59 at the right end arranged in parallel to the first transmission shaft 53 and in mesh with the power transmission gear 57; a first bevel gear 63 spline linked with this intermediate shaft 59 at the left end; a second bevel gear 65 in mesh with this first bevel gear to convert the revolution direction at a right angle; and a transmission shaft 67 for transmitting the rotational force of this second bevel gear 65 to the rear wheel shaft.

This transmission shaft 67 includes a front side (in FIG. 2) or lefthand (in FIG. 3) rotary transmission shaft 67a and a rear side (in FIG. 2) or the righthand (in FIG. 3) rotary transmission shaft 67b. In FIG. 3, a small diameter bore 69 and a large diameter bore 71 are formed in an end surface of the transmission shaft 67b, and an end of the transmission shaft 67a is fitted to the small diameter bore 69 so that these two shafts 67a and 67b are rotatable relative to each other coaxially.

Figure 3:
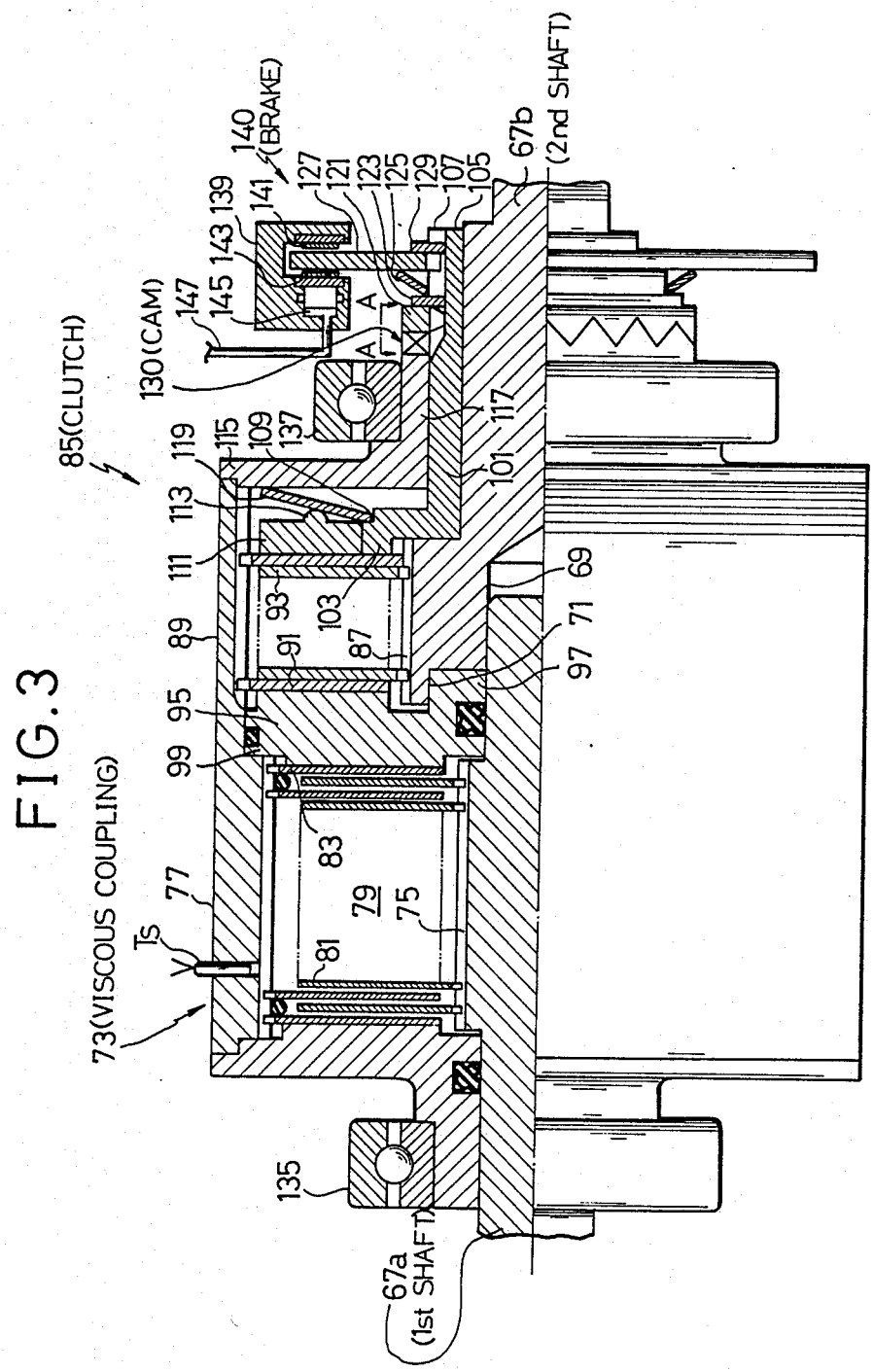
FIG. 3 is an enlarged cross-sectional view showing the essential portion of the embodiment.

With reference to FIG. 3, a viscous coupling 73 is arranged on the lefthand end of the rotary transmission shaft 67a. An inner hub 75 of the viscous coupling 73 is formed on the outer circumference of the transmission shaft 67a; and an outer case 77 constituting a part of the coupling case is rotatably supported by the transmission shaft 67a.

The inner hub 75 and the outer case 77 of the viscous coupling 73 form an enclosed working chamber 79 filled with viscous fluid such as silion oil of high viscocity. Within this enclosed working chamber 79, a plurality of inner plates 81 spline coupled to the outer circumference of the inner hub 75 and a plurality of outer plates 83 spline coupled to the inner circumference of the outer case 77 are arranged alternately one by one so as to form resistant plates.

Further, in FIG. 3, a clutch mechanism 85 is arranged on the lefthand end of the transmission shaft 67b. An inner hub 87 of the clutch 85 is formed on the outer circumference of the rotary transmission shaft 67b; and an outer case 89 constituting a part of the coupling case is formed integral with the outer case 77 of the viscous coupling 73. A plurality of clutch plates 91 spline coupled to the outer circumference of the inner hub 87 and a plurality of clutch plates 93 spline coupled to the inner circumference of the outer case 89 are arranged alternately one by one within a clutch housing formed between the inner hub 87 and the outer case 89 so as to be axially movable for providing clutch engagement plates.

Between the viscous coupling 73 and the clutch 85, there is provided a flange 95 formed with an inner diameter substantially equal to the small diameter bore 69 formed at an end surface of the transmission shaft 67b and an cylindrical portion 97 formed with an outer diameter fittable to the large diameter bore 71 also formed at the end surface of the transmission shaft 67b. The coupling side wall 99 of this flange 95 constitutes a righthand wall of the working chamber 79 of the viscous coupling 73.

A slide sleeve 101 for releasing the clutch 85 is made up of a flange portion 103 and a sleeve portion 105, and rotatably fitted to the transmission shaft 67b with the flange portion 103 brought into contact with the clutch plates 91 and 93. Further, a spline 107 is formed on the right side end on the outer circumference of the sleeve 105, and a cutout 109 is formed on the flange portion 103.

A push plate 111 is an annular plate for urging the clutch plates 91 and 93 into contact with each other and loosely fitted to an outer circumference of the flange portion 103 of the slide sleeve 101. This push plate 111 is formed with a circular convex portion 113 at roughly the radially middle portion thereof so as to apply a uniform force all over the surface of the clutch plates 91 and 93 when being urged. Further, it is of course possible to form the push plate 111 and the slide sleeve 101 integral with each other.

On the right side of the outer case 89 of the clutch 85, a member composed of a flange portion 115 and a cylindrical portion 117 is disposed with the cylindrical portion 117 rotatably fitted to a sleeve 105 of the slide sleeve 101.

A clutch spring 119 is disposed within the outer case 89 of the clutch 85 in such a way that the outer circumference end thereof is in contact with the flange portion 115, the inner circumferential end thereof is in contact with the cutout 109 of the slide sleeve 101, and the circular middle portion thereof is in contact with the convex portion 113 of the push plate 111. Under these conditions, the clutch spring 119 urges the push plate 111 and the slide sleeve 101 simultaneously toward the leftward direction with a point in contact with the flange 115 as a fulcrum. Therefore, the clutch plates 91 and 93 are urged against each other between the push plate 111 and the flange 95 into clutch engagement condition.

A cam ring 121, a first washer 123 and a second washer 129 are fixedly engaged with the spline 107 formed in the slide sleeve 101 being arranged from the left side to the right side. Further, a brake disk 127 is loosely engaged with the spline 107 so as to be axially movable along the spline 107 between the two washers 123 and 129. Further, a disk-shaped spring 125 is disposed between the first washer 123 and the brake disk 123 to urge the cam ring 121 toward the cam portion of the cylindrical portion 117 via the washer 123. The washer 129 limits the rightward movement of the brake disk 127.

Figure 4A:
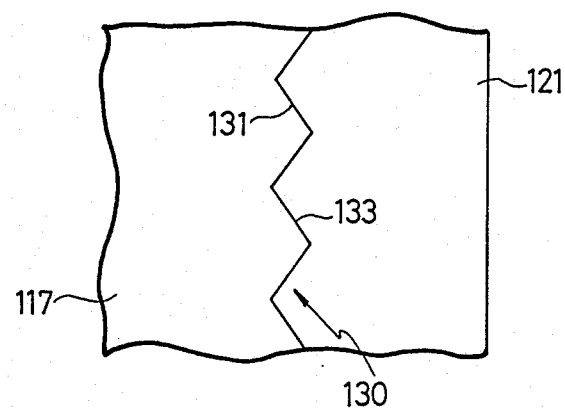
FIG. 4(A) is a cross-sectional view taken along the line A—A in FIG. 3.

As depicted in FIG. 4(A), cam means 130 comprises a right angled cam 131 formed at an end surface of the cylindrical portion 117 disposed on the right side of the outer case 89 and a right angled cam 133 formed in the cam ring 121. These two cam members 131 and 133 are engaged with each other by an elastic force of the disk-shaped spring 125.

The viscous coupling 73 and the clutch 85 are rotatably supported by a vehicle body via bearings 135 and 137.

A U-shaped cross-section brake frame 139 is disposed so as to sandwich the brake disk 127. A fixed brake shoe 141 is provided on one of two inner opposing surfaces of the U-shaped frame 139 and a movable brake shoe 143 is provided on the other of the two inner opposing surfaces thereof. A hydraulic cylinder 145 is provided on the rear side of the movable brake shoe 143 and a hydraulic passage 147 is connected to this hydraulic cylinder 145.

With reference to FIG. 2 again, this hydraulic path 147 is connected to a master cylinder 153 to which a front wheel brake hydraulic passage 149 and a rear wheel brake hydraulic passage 151 are also connected. When a brake pedal 155 is depressed, the depressed force is transmitted to the master cylinder 153 via a vacuum assist 157 so as to apply a hydraulic pressure through these hydraulic passages 147, 149 and 151. That is, braking means 140 is composed of the brake disk 127, the brake frame 139, the brake shoes 141 and 143, the hydraulic cylinder 145 and the hydraulic passage 147.

The transmission shaft 67b is linked with a rear wheel final reduction gear device 165 via a universal joint 159, a propeller shaft 161, and another universal joint 163. Further, the clutch operating means is composed of the slide sleeve 101, the cam means 130, and the brake means 140.

This rear wheel final reduction gear device 165 includes a gear assembly (a pair of bevel gears 167 and 169) for transmitting the rotational force supplied from the universal joint 163 to the rear wheel shaft after speed reduction and direction conversion at a right angle, and a second (rear wheel) differential gear device 171 linked with the bevel gear 169 rotatable coaxially with the rear wheel shaft. This rear wheel differential gear device 171 is constructed in the same way as in the front wheel differential gear device 29, and linked with both the right and left rear wheels 179 and 181 via a constant velocity joint 173, a drive wheel shaft 175 and another constant velocity joint 171, respectively.

The operation of the power transmission apparatus of the present invention thus constructed will be described hereinbelow.

A rotational power of the engine 1 is transmitted to the input shaft 13 of the transmission 11 via the clutch 9. The revolution speed of the input shaft 13 is geared down via the speed change gear assembly 17 and transmitted to the output shaft 15 to drive the final reduction gear 23 via the drive gear 19.

When the final reduction gear 23 rotates, the casing 31 of the front wheel differential gear device 29 rotates. The rotational force of the casing 31 is differentially distributed by the pinion gears 33 and 35 and the side gears 37 and 39 and then transmitted to both the right and left front wheels 49 and 51, respectively via the right or left front wheel shaft 27 or 41, the constant velocity joint 43, the wheel drive shaft 45, and the constant velocity joint 47.

Further, the rotational force of the casing 31 of the front wheel differential gear device 29 is transmitted to the power transmission gear 57 via the first transmission shaft 53 to rotate the intermediate gear 61, and then to the transmission shaft 67a after the rotational direction has been converted at a right angle via the second bevel gear 65.

The rotational force of the transmission shaft 67a is transmitted from the inner hub 75 to the outer case 77 of the viscous coupling 73, further from the outer case 89 to the inner hub 87 of the clutch 85 to rotate the transmission shaft 67b.

The rotational force of the transmission shaft 67b is also transmitted to the rear wheel final reduction gear device 165 via the universal joint 159, the propeller shaft 161, and the universal joint 163 to rotate the rear wheel differential gear device 171 after speed reduction and rotational direction conversion.

The rear wheel differential gear device 171 differentially distributes the given rotational force to drive both the right and left rear wheels 179 and 181, respectively via the constant velocity joint 173, the rear wheel shaft 175, and the constant velocity joint 177.

Figure 4B:
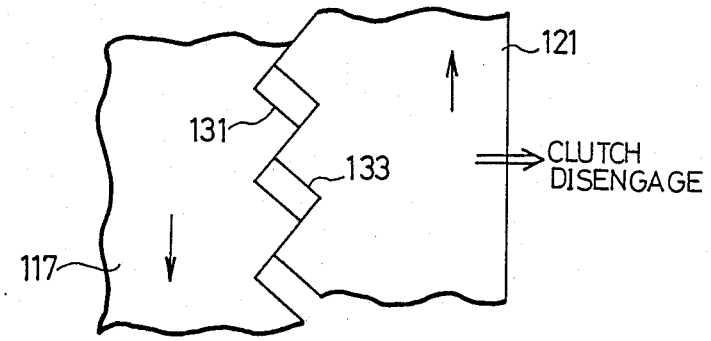
FIG. 4(B) is a view for assistance in explaining the cam operation.

When the brake pedal 155 is depressed, a hydraulic pressure is applied from the master cylinder 153 to each hydraulic passage 147, 149 and 151. Pressure developed in the hydraulic passages 149 and 151 is used to brake the front and rear wheels. Pressure developed in the hydraulic passage 147 is applied into the cylinder 14 to move the movable brake shoe 143 in the rightward direction in FIG. 3, so that the brake disk 127 is sandwiched between the movable brake shoe 143 and the fixed brake shoe 141 for braking operation. When the brake disk 127 is braked, since the cylindrical portion 117 of the outer case 89 of the clutch 85 rotates faster than the cam ring 121 fixed to the spline 107 of the slide sleeve 101, the cam 131 rotates over the cam 133 against the elastic force of the disk-shaped spring 125 as shown in FIG. 4(B). As a result, a thrust force to move the cam ring 121 in the rightward direction in FIG. 4(B) is produced, and therefore the slide sleeve 101 is slid along the shaft 67b in the rightward direction to disengage the clutch 85 against the elastic force of the clutch spring 119. Accordingly, torque transmission is intermitted between the first rotary transmission shaft 67a and the second rotary transmission shaft 67b.

When the clutch 85 is being engaged, since the front and rear wheel shafts are connected via the viscous coupling 73, when the vehicle is running with a small difference in revolution speed between the front and rear wheels, the vehicle is driven by two-wheel drive operation substantially. However, when the difference in revolution speed between the front and rear wheels increases, since a large torque is transmitted to the rear wheels, the vehicle is to be driven by four-wheel drive operation. The above switching operation from two- to four-wheel drive operation or vice versa is effected automatically.

When the vehicle is started or accelerated, since the center of vehicle gravity shifts rearward, a large load is applied to the rear wheels. However, since a large torque is applied to the rear wheels due to a difference in revolutional speed between the front and rear wheels, it is possible to effectively accelerate the vehicle.

When the vehicle sticks in the mud and therefore the front or rear wheels slip or stick, since a larger torque is applied to either of the front or rear wheels, it is possible for the vehicle to escape these conditions.

When the vehicle is put into a garage at a low speed, since a difference in revolutional speed between the front and rear wheels can be absorbed by the viscous coupling 73, no tight-corner braking phenomenon will occur.

When the vehicle is braked for emergency stop and therefore the front or rear wheels are locked, a major part of the brake force is transmitted to non-locked wheels via the viscous coupling 73 to brake the non-locked wheels. This phenomenon is disadvantageous in the case of antiskid braking system (ABS) for controllably distributing braking force to each wheel. To overcome the above-mentioned problem, the torque transmission from the front wheels to the rear wheels is cut off or intermitted by the clutch 85 in the present invention.

Further, since the torque transmission can be cut off by the clutch 85, it is possible to protect the viscous coupling 73 from excessive load when fluid temperature rises abnormally.

Further, in this embodiment, since the operation of the clutch 85 is linked with the foot brake, the apparatus of the present invention can be incorporated in an antiskid braking system without providing additional operating means. In this case, the operation of the clutch 85 is operative for a short time, the energy loss due to clutch operation for the power transmission apparatus is small.

In the above embodiment, a disk brake is used for the clutch operating means. Without being limited, however, it is also possible to select an appropriate brake system such as drum, band, under consideration of cost or space. In this case, the hydraulic elements for controlling the clutch mechanism 85 will be eliminated.

Further, when balls are used between the cylindrical portion 117 of the outer case 89 and the cam means 130 (the cam ring 121), it is possible to generate a large thrust force by a small braking force.

Further, the hydraulic pressure for operating the braking means 140 can be provided separately from the foot brake system. In this case, it is possible to engage or disengage the clutch mechanism independently from the brake system.

Furthermore, when a temperature sensor Ts is provided for the viscous coupling 73 to disengage the clutch when fluid temperature rises beyond a predetermined value, it is possible to automatically protect the viscous coupling 73 from an excessive load. In this case, a hydraulic pressure is applied from a hydraulic source to the hydraulic cylinder 145 via an appropriate valve, for instance, actuated open in response to a signal generated from the temperature sensor Ts when fluid temperature rises beyond a predetermined value.

As described above, the power transmission apparatus of the present invention can be incorporated in an antiskid braking system, in spite a simple construction, under protection of viscous coupling from excessive load.

What is claimed is:
1. A power transmission apparatus, comprising:
   (a) a first rotary transmission shaft;
   (b) a second rotary transmission shaft rotatably and coaxially coupled to said first rotary transmission shaft;
   (c) an outer coupling case rotatably and coaxially disposed around said first and second rotary transmission shafts in such a way as to form an enclosed working chamber filled with a viscous fluid between said first rotary transmission shaft and one portion of said outer coupling case and a clutch housing between said second rotary transmission shaft and another portion of said outer coupling case;
   (d) a plurality of resistant plates arranged within the working chamber and circumferentially fixed alternately to said first rotary transmission shaft and said outer coupling case, for coupling said first rotary transmission shaft to said outer coupling case via the viscous fluid;
   (e) a clutch mechanism disposed within the clutch housing for engaging a disengaging said outer coupling case with or from said second rotary transmission shaft, said clutch mechanism including:
      (1) a plurality of clutch plates arranged within the clutch housing so as to be alternatively circumferentially fixed but axially movable relative to said outer coupling case and said second rotary transmission shaft;
      (2) a clutch spring arranged within the clutch housing; and
      (3) a slide sleeve disposed coaxially with said secondary rotary transmission shaft and urged by said clutch spring toward said clutch plates to bring said clutch plates into contact with each other for clutch engagement; and
   (f) clutch operating means including a foot brake, responsive to a braking force applied thereto, for operating said clutch mechanism.
2. The power transmission apparatus of claim 1, wherein said clutch operating means comprises:
   (a) a cylindrical portion of said outer coupling case, an end surface of said cylindrical portion being formed with a cam portion;
   (b) a cam ring fixed to said slide sleeve and engaged with the cam portion of said cylindrical portion;
   (c) a brake disk spline coupled to said slide sleeve so as to be circumferentially fixed but axially movable relative to said slide sleeve; and
   (d) a U-shaped brake frame including a movable brake shoe and a fixed brake shoe, for sandwiching said brake disk between said two brake shoes when said movable brake shoe is moved by hydraulic source pressure generated by a braking force applied to said foot brake, whereby when said brake disk is braked, said slide sleeve is moved along said second rotary transmission shaft by said cam ring engaged with said cam portion of said cylindrical portion to disengage said second rotary transmission shaft from said outer coupling case.

3. A power transmission apparatus, comprising:
(a) a first rotary transmission shaft;
(b) a second rotary transmission shaft rotatably and coaxially coupled to said first rotary transmission shaft;
(c) an outer coupling case rotatably and coaxially disposed around said first and second rotary transmission shafts in such a way as to form an enclosed working chamber filled with a viscous fluid between said first rotary transmission shaft and one portion of said outer coupling case and a clutch housing between said second rotary transmission shaft and another portion of said outer coupling case;
(d) a plurality of resistant plates arranged within the working chamber and circumferentially fixed alternately to said first rotary transmission shaft and said outer coupling case, for coupling said first rotary transmission shaft to said outer coupling case via the viscous fluid;
(e) a temperature sensor for detecting temperature within the working chamber and outputting a temperature signal when the temperature within the working chamber rises above a predetermined temperature; and
(f) a clutch mechanism, disposed within the clutch housing, for engaging or disengaging said outer coupling case from said second rotary transmission shaft in response to said temperature signal.

* * * * *